April 1, 1930. T. IZUMI 1,752,636
DEVICE FOR MANUFACTURING A TAPE HAVING BRAID-LIKE WRINKLES
OR PLAITS FROM SOLIDIFIABLE VISCOUS SOLUTION
Filed Aug. 17, 1928
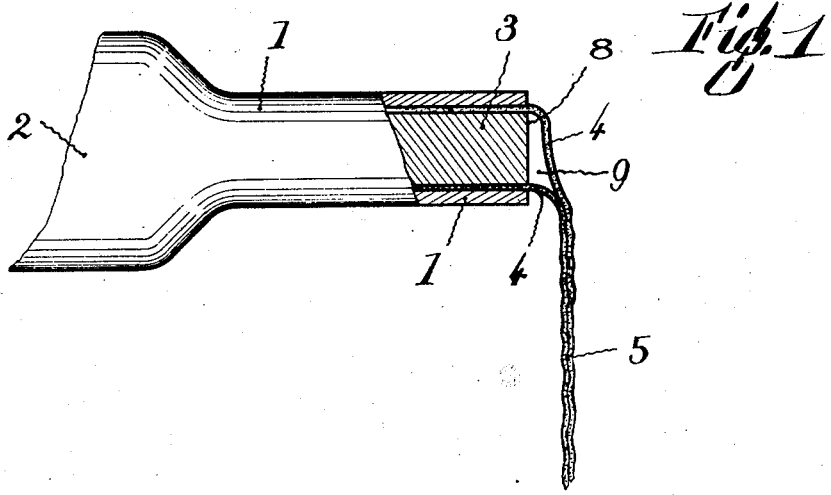
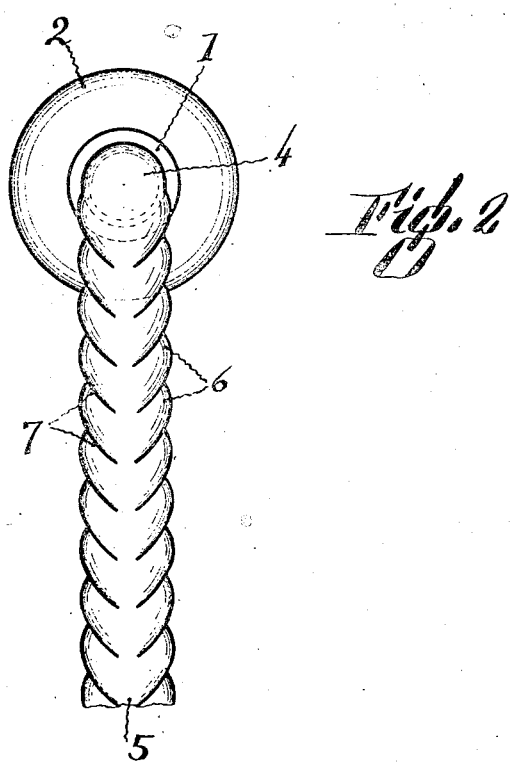
Inventor
Torazo Izumi
By Marion & Marion
Attorneys Patented Apr. 1, 1930

1,752,636

UNITED STATES PATENT OFFICE

TORAZO IZUMI, OF TOKYO, JAPAN

DEVICE FOR MANUFACTURING A TAPE HAVING BRAIDLIKE WRINKLES OR PLAITS FROM SOLIDIFIABLE VISCOUS SOLUTION

Application filed August 17, 1928. Serial No. 300,607.

This invention relates to a process for manufacturing rapidly and simply a tape having braid-like wrinkles or plaits from solidifiable viscous solution. The object thereof is to manufacture by a simple known device beautiful braid-like tape fit for ornament, hats and other different purposes.

Referring to the accompanying drawing which illustrates the important part of this device during the manufacture of the said tape, Figure 1 is a sectional side view of a nozzle for delivering the tape and Figure 2, a front view of the same.

In the drawing the same reference numerals show the same parts. This invention relates to a device for manufacturing the tape 5 having braid-like wrinkles or plaits from viscous celluloid solution or other solidifiable viscous solutions. Put viscous solution in a vessel provided with a nozzle 1 for delivering the solution which has a tubular slot and force it into the said slot. If the end surface 8 of the nozzle is placed in a vertical position, the solution will advance in tubular form through the slot, and when delivered from the end surface, will droop due to gravity, at the same time making wrinkles or plaits and a tape 5 will be formed.

The means for pushing out viscous solution used in this invention is provided with a nozzle 1 having a round hole and core 3 in that hole to form a tubular slot at the end of a vessel 2 which has a means for pushing the solution such as a machine for making celluloid tube so that both the outer peripheries of the round hole and of the core may form a tubular slot, the end surface of which is vertical. If viscous solution, for example celluloid viscous solution is placed in the vessel 2 and pressure applied thereto, it will advance into the tubular slot and be pushed out from the tubular hole of the end surface 8 in the form of a tube.

Supposing that the above end surface turns downward in a horizontal position, the solution will always droop in a tubular form and make a tube. However, as in this device the end surface 8 is in a vertical position, the pushed-out celluloid tube undergoes the action of gravity at once and droops. The upper and lower films 4 which have become tubular are stuck together and transformed into a tape having wrinkles or plaits naturally made on both sides of the films 4. At the same time, wrinkles or plaits are formed periodically, as the atmosphere, and the air in the space formed by the end surface 8 and the films 4 act upon the end surface. Therefore, the tape 5 is also formed periodically. That is to say, the wrinkles or plaits 7 together with the swells 6 between them produce a shape of braid. The solution becomes solidified forming a tape as it is delivered from the nozzle and contacts with the atmosphere. The tape 5 thus made is very beautiful and is suitable for various purposes. Further, if the coming-out tape 5 is arranged in a suitable shape on a board, it will be solidified in that shape. Thus, the desired article may be produced, for instance, if the coming-out tape 5 is put together helically while being moved circularly, a disc like a flat helical plate made of braid will be formed.

According to the present invention the beautiful braid-like tape 5 is not only manufactured easily and quickly by a very simple process, but also various kinds of articles can be made of it easily. Moreover, it can be used for various purposes according to the kind of viscous solution employed. The speed of the manufacture of the tape may be changed freely according to the pressure given to the solution; and the thickness and size of the film according to the size of the tubular slot.

I claim:

A process for manufacturing an ornamental tape from viscous solidifiable solutions with any known tube-making machine, comprising the steps of forcing a viscous solution from an horizontally disposed tube-making nozzle, sticking together the walls of the outcoming tube in a downward direction, and receiving the flattened braided tube upon a flat surface for drying purposes.

In witness whereof I have hereunto set my hand.

TORAZO IZUMI.